United States Patent [19]

Conochie et al.

[11] Patent Number: 5,396,850
[45] Date of Patent: Mar. 14, 1995

[54] TREATMENT OF WASTE

[75] Inventors: David. S. Conochie, Hawthorn East; Robin J. Batterham, Sandringham; Terry A. Matthews, Wheelers Hill, all of Australia

[73] Assignee: Technological Resources Pty. Limited, Melbourne, Australia

[21] Appl. No.: 98,368
[22] PCT Filed: Dec. 7, 1992
[86] PCT No.: PCT/AU92/00657
  § 371 Date: Oct. 13, 1993
  § 102(e) Date: Oct. 13, 1993
[87] PCT Pub. No.: WO93/10862
  PCT Pub. Date: Jun. 10, 1993

[30] Foreign Application Priority Data

Dec. 6, 1991 [AU] Australia .............. PK9873

[51] Int. Cl.⁶ ................................ F23G 5/00
[52] U.S. Cl. ................... 110/346; 110/235; 422/184; 588/201
[58] Field of Search ........... 110/346, 235, 250; 422/184; 588/201

[56] References Cited

U.S. PATENT DOCUMENTS

| | | | |
|---|---|---|---|
| 2,647,045 | 7/1953 | Rummel | 48/206 |
| 3,845,190 | 10/1974 | Yosim et al. | 423/184 |
| 3,890,908 | 6/1975 | von Klenck et al. | 110/8 |
| 4,140,066 | 2/1979 | Rathjen et al. | 110/235 |
| 4,145,396 | 3/1979 | Grantham | 423/22 |
| 4,230,053 | 10/1980 | Deardorff et al. | 110/346 |
| 4,246,255 | 1/1981 | Grantham | 423/659 |
| 4,400,936 | 8/1983 | Evans | 60/274 |
| 4,402,274 | 9/1983 | Meenan et al. | 110/346 |
| 4,431,612 | 2/1984 | Bell et al. | 422/186.21 |
| 4,432,344 | 2/1984 | Bennington et al. | 126/438 |
| 4,447,262 | 5/1984 | Gay et al. | 48/92 |
| 4,481,891 | 11/1984 | Takeshita et al. | 110/238 |
| 4,565,574 | 1/1986 | Katayanna et al. | 75/130.5 |
| 4,574,714 | 3/1986 | Bach et al. | 110/346 |
| 4,602,574 | 7/1986 | Bach et al. | 110/346 |
| 4,681,599 | 7/1987 | Obkircher | 48/92 |
| 4,925,999 | 5/1990 | Yonezawa | 585/469 |
| 5,271,341 | 12/1993 | Wagner | 110/346 |

FOREIGN PATENT DOCUMENTS

| | | |
|---|---|---|
| 62-188713 | 8/1987 | Japan . |
| 90/00754 | 11/1990 | Sweden . |
| 2042624 | 8/1981 | United Kingdom . |
| 911091 | 3/1982 | U.S.S.R. . |

OTHER PUBLICATIONS

Copy of International Search Report for PCT/AU92/00657 Mar. 1993.
Patent Abstracts of Japan, M-301, p. 6, JP, A, 59-27117 Feb. 1984.
Patent Abstracts of Japan, C-225, p. 226, JP, A, 59-28505 Feb. 1984.

*Primary Examiner*—Edward G. Favors
*Attorney, Agent, or Firm*—Merchant, Gould, Smith, Edell, Welter & Schmidt

[57] ABSTRACT

A method of destroying organic waste in a bath of molten metal and slag contained in a vessel (3) is disclosed. The method comprises injecting organic waste into the bath to form a primary reaction zone (13) in which the organic waste is thermally cracked and the products of the thermal cracking which are not absorbed into the bath are released into the space above the surface of the bath. The method further comprises injecting an oxygen-containing gas toward the surface of the bath to form a secondary reaction zone (17) in the space above the surface of the bath in which the oxidizable materials in the products from the primary reaction zone (13) are completely oxidized and the heat released by such oxidation is transferred to the bath. In order to facilitate efficient heat transfer from the second reaction zone (13) to the bath, the method further comprises injecting an inert or other suitable gas into the bath to cause molten metal and slag to be ejected upwardly from the bath into the secondary reaction zone (17).

24 Claims, 3 Drawing Sheets

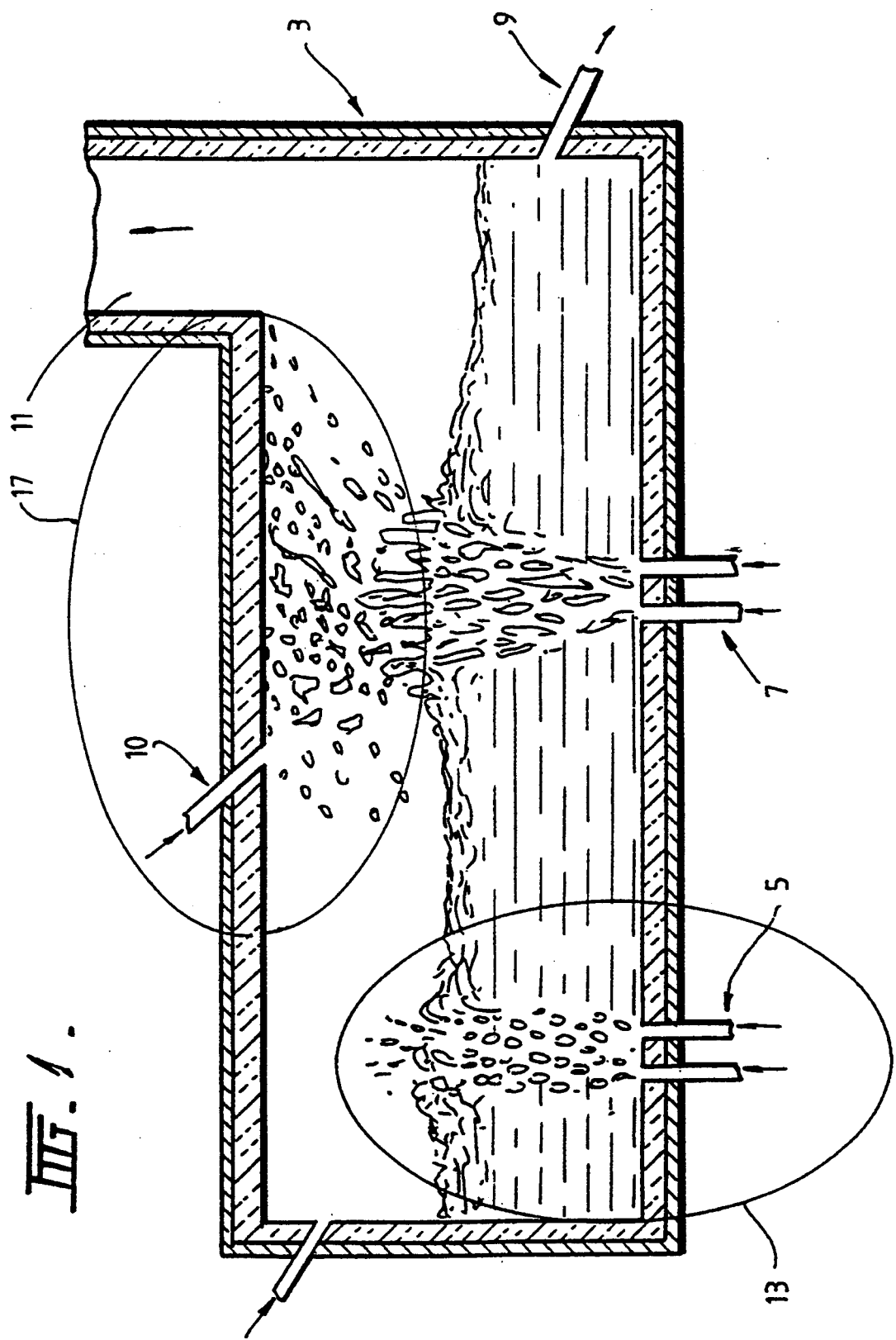

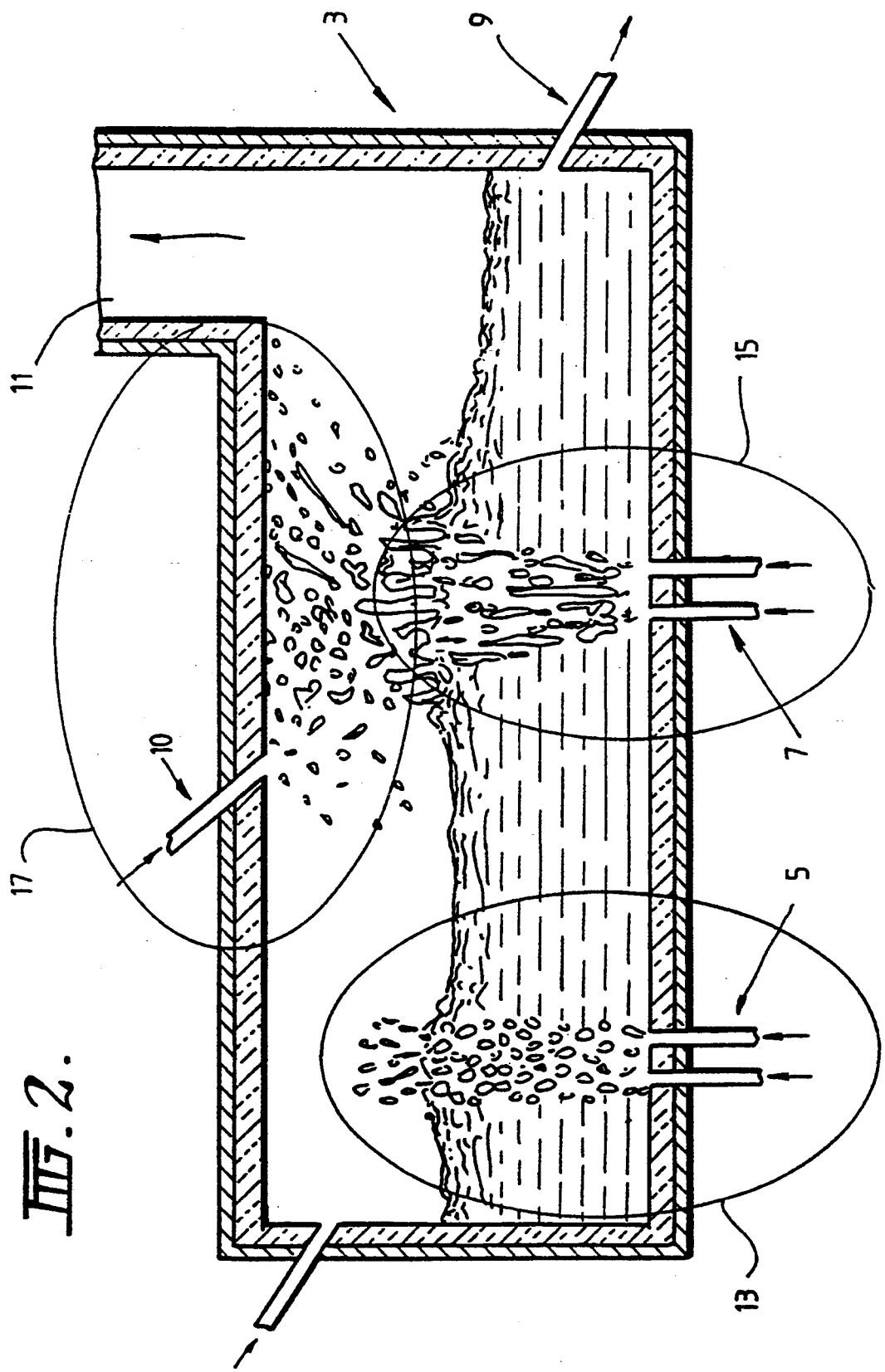

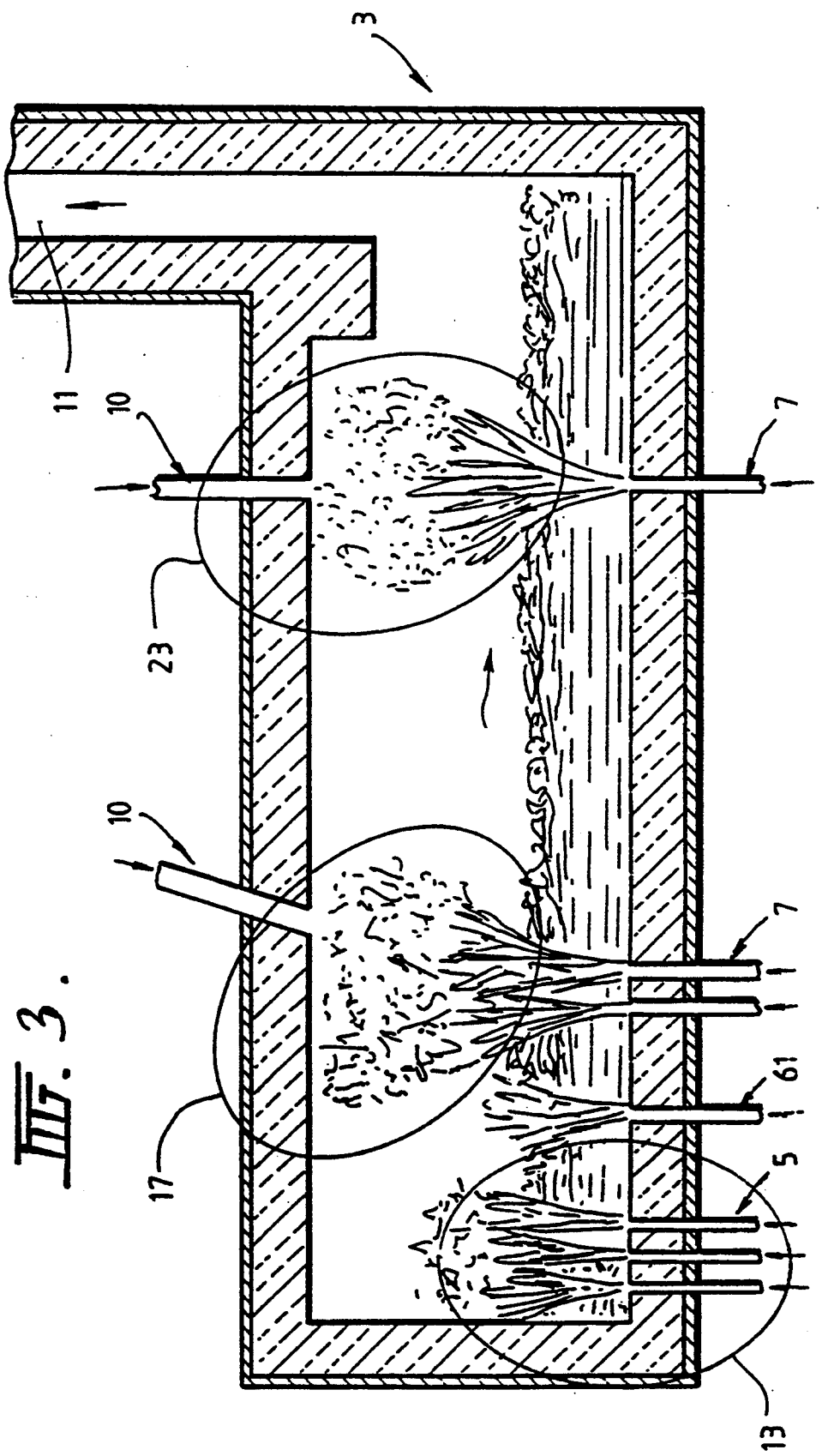

TREATMENT OF WASTE

The present invention relates to the destruction of organic waste and in particular toxic organic waste.

The term "organic waste" is herein understood to include but is not limited to toxic materials such as pesticides, herbicides, paints, medical residues, waste oils, contaminated solvents, and black liquor.

U.S. Pat. Nos. 4,574,714 and 4,602,574 by Bach and Nagel disclose a method of destroying organic waste which is based on the use of a bath of molten metal, typically comprising at least 10% iron. The method comprises maintaining the bath at a temperature of at least 1400° C. and injecting organic waste and oxygen-containing gas into the bath from above and/or below the surface of the bath to crack thermally (pyrolyse) and at least partially oxidize the oxidizable portions of the organic waste. The amount of oxygen-containing gas added to the bath is selected so that the stoichiometric ratio of oxygen to the oxidizable portion of the organic waste is at least 1:1 to ensure that there is sufficient oxygen input to oxidize completely the oxidizable portions in and above the surface of the bath.

The complete oxidation of the oxidizable portions of the organic waste is particularly important to ensure that there are no hydrocarbons remaining in the off-gas which are toxic or could form toxic organic materials such as furans and dioxins as the off-gas cools to ambient temperature. A further important consideration in this regard is to ensure that the concentration of oxygen in the off-gas is as low as possible since there is some evidence that oxygen is favourable to the formation of at least dioxins.

A disadvantage of the method disclosed in the U.S. patents is that there is a relatively high risk of the formation of a continuous path in the bath through which the organic waste can flow to escape the bath in a substantially untreated form.

An object of the present invention is to provide a method of destroying organic waste which has a higher assurance against such break-out of organic waste from the bath than is possible with the method disclosed in the U.S. patents.

According to the present invention there is provided a method of destroying organic waste in a bath of molten metal and slag contained in a vessel, the method comprising:

(a) injecting organic waste into the bath to form a primary reaction zone in which the organic waste is thermally cracked and the products of the thermal cracking which are not absorbed into the bath are released into the space above the surface of the bath; and (b) injecting an oxygen-containing gas towards the surface of the bath to form a secondary reaction zone in the space above the surface of the bath in which the oxidizable materials in the products from the primary reaction zone are completely oxidized and the heat released by such oxidation is transferred to the bath.

The above described method of the present invention provides a high level of assurance against unreacted or partially reacted organic waste short circuiting the process and reporting in the exit gas stream from the vessel. This is achieved by providing at least two separate reaction zones through which the organic waste must pass before exiting the vessel.

It is preferred that the method comprises injecting organic waste with a carrier gas into the bath to form the primary reaction zone. It is preferred that the carrier gas be an inert gas.

It is preferred that the method further comprises injecting oxygen-containing gas into the primary reaction zone to at least partially oxidize the products of thermal cracking.

It is particularly preferred that the method comprises injecting the oxygen-containing gas into the primary reaction zone in a stoichiometric ratio of oxygen to the oxidizable portion of at least 1:1.

It is preferred that the method further comprises controlling the temperature in the secondary reaction zone to be at least 200° C. higher than the temperature of the bath.

It is preferred particularly that the method comprises controlling the temperature in the secondary reaction zone to be in the range of 1500° to 2700° C.

It is particularly preferred that the method further comprises injecting carbonaceous material into the bath to form a carburizing zone in which the carbon in the carbonaceous material is dissolved into the bath.

The term "carbonaceous material" is herein understood to include: solid carbonaceous fuels such as coke and coal; liquid fuels such as oil, light fuel oil, diesel oil and heavy fuel oil; and gaseous fuels, such as natural gas, methane, ethane, propane, butane; or any mixtures of the fuels.

In the above described preferred embodiment the heat transferred to the bath from the secondary reaction zone is used to balance the heat lost from the bath in the endothermic reactions in the carburizing zone and in some instances in the primary reaction zone.

The principal purpose of oxygen injection into the primary reaction zone is to at least partially oxidize the injected organic waste and the products of thermal cracking of the organic waste. However, concurrently, oxygen reacts with dissolved carbon in the bath to form CO and with the bath metal to form metal oxides which either report to the slag or are reduced by dissolved carbon back to metal. The carburization of the metal in the carburizing zone maintains the concentration of dissolved carbon in the metal above an appropriate minimum level.

Typically, the products emerging from the primary reaction zone into the space above the bath comprise the oxidizable materials CO, $H_2$ and carbonaceous material arising from the thermal cracking of the organic waste. The products may also contain volatilized species such as metals and other compounds and elements which contaminate the organic waste or are added with the organic waste. Typically, the reaction products from the secondary reaction zone comprise $CO_2$ and $H_2O$.

It is preferred that any volatilized species be scrubbed in the secondary reaction zone.

It is preferred that the organic waste and oxygen-containing gas be injected into the primary reaction zone through the bottom of the vessel.

It is preferred that the method comprises injecting a gas into the bath to cause molten metal and slag to be ejected upwardly from the bath into the secondary reaction zone to facilitate efficient heat transfer to the bath and scrubbing of volatilized species and any particulate material in the products from the primary reaction zone.

One particularly preferred embodiment comprises injecting the gas into the carburizing zone of the bath with the carbonaceous material and injecting the oxygen-containing gas towards the surface of the bath above the carburizing zone so that the secondary reaction zone is located immediately above the carburizing zone.

Another particularly preferred embodiment comprises injecting the gas into the bath to form a gas injection zone adjacent the carburizing zone and injecting the oxygen-containing gas into the space above the gas injection zone.

It is preferred that the method comprises injecting into the primary reaction zone an additive for forming preferred reaction products. The additive may be selected as required to match the composition of the organic waste. By way of example, where the organic waste includes halogens, such as chlorides, it is preferred that the additive comprise an alkaline earth for binding chemically with the halogens.

It is preferred that the method comprises injecting slag forming agents into the bath together with or separately to the organic waste to condition the composition of the slag selectively. Typically, the slag forming agents comprise CaO and fluorspar.

It is preferred that the bath comprises at least 10% metal. It is particularly preferred that the bath comprises at least 70% metal. It is more particularly preferred that the bath comprises at least 80% metal.

It is preferred that the metal be selected from one or more of the group comprising iron, ferroalloys, tin, nickel, chromium, silicon, and copper, and mixtures thereof. It is particularly preferred that the metal comprises iron.

It is preferred that the gas injected into bath to cause molten metal and slag to be ejected upwardly into the secondary reaction zone be selected from one or more of an inert gas, recycled process gas, natural gas, carbon dioxide, propane, or butane, or mixtures of the gases. It is particularly preferred that the inert gas be nitrogen.

It is preferred that the oxygen-containing gas be selected from the group comprising oxygen, air, oxygen enriched air, and steam. It is particularly preferred that the oxygen-containing gas be air. It is more particularly preferred that the air be preheated. Typically, the air is preheated to temperatures in the range of 900° to 1600° C.

The present invention is described further with reference to the accompanying drawings in which:

FIG. 1 illustrates a preferred embodiment of a method of destroying organic waste in accordance with the present invention;

FIG. 2 illustrates another preferred embodiment of a method of destroying organic waste in accordance with the present invention; and FIG. 3 illustrates a further preferred embodiment of a method of destroying organic waste in accordance with the present invention.

Each of the preferred embodiments of the method of the present invention shown in FIGS. 1 to 3 is carried out in a vessel generally identified by the numeral 3.

The vessel 3 may be of any suitable design of metallurgical vessel with refractory lined internal walls and an outer metal shell. In the preferred arrangement shown in FIGS. 1 to 3 the vessel 3 is a generally cylindrical shape disposed horizontally and has bottom tuyeres 5,7, a slag-metal tap 9, an air injection port 10, and an upper off-gas outlet 11 at one end of the vessel 3. Typically, the ratio of the length and the diameter of the vessel is 3:1.

The vessel 3 contains a volume of molten metal which comprises at least 10% iron and a layer of slag (not shown) at a temperature of at least 1400° C. The other metals in the bath may be selected as required and, by way of example, may also include one or more of ferroalloys, tin, nickel, silicon, and copper.

The preferred embodiment of the method shown in FIG. 1 comprises injecting organic waste and a suitable carrier gas such as an inert gas through the bottom tuyeres 5 to form a primary reaction zone indicated schematically by the circle 13 which is located at the end of the vessel 3 remote from the off-gas outlet 11. The organic waste is thermally cracked in the primary reaction zone 13 into C and $H_2$. A proportion of the products remain in the bath and the remainder of the products are released into the region in the space above the bath that is directly above the primary reaction zone 13.

The method shown in FIG. 1 also comprises injecting pre-heated air, typically at a temperature in the range of 900° to 1600° C., or any other suitable oxygen-containing gas through injection port 10 towards the surface of the bath adjacent the primary reaction zone 13 to form a secondary reaction zone indicated schematically by the circle 17 in the region of the space above the bath that is located between the region that is directly above the primary reaction zone 13 and the off-gas outlet 11. Simultaneously, nitrogen or any other suitable gas is injected through tuyeres 7 into the bath immediately below the secondary reaction zone 17 and causes eruption of molten metal and slag in splashes and/or droplets from the surface of the bath into the secondary reaction zone 17. Typically, the nitrogen is injected in an amount greater than or equal to 0.1 $Nm^3$ $min^{-1}$ $tonne^{-1}$ of molten metal in the bath. The pre-heated air completely oxidizes the products from the primary reaction zone 13 as the products flow through the secondary reaction zone 17 from the space directly above the primary reaction zone 13 towards the off-gas outlet 11. Furthermore, the heat released by such oxidation is efficiently transferred to the splashes and/or droplets of molten metal and slag and subsequently into the bath when the splashes and/or droplets fall downwardly to the surface of the bath. The splashes and/or droplets also scrub any volatilized species such as metal contaminants and any particulate material in the organic waste as the products flow through the secondary reaction zone 17 and transfer the scrubbed values to the bath. It is noted that in effect the splashes and/or droplets of molten metal and slag form a curtain in the secondary reaction zone 17 which is an effective and efficient means of transferring heat to the bath and scrubbing volatilized species and particulate material from products flowing through the secondary reaction zone 17.

Typically, the temperature in the secondary reaction zone 17 is controlled to be at least 200° C. higher than that of the molten metal. Typically, the temperature in the secondary reaction zone 13 varies between 1500° C. and 2700° C.

It can be readily appreciated from the foregoing that the secondary reaction zone 17 has three important functions. Specifically, the secondary reaction zone 17:
  (a) completely oxidizes any oxidizable portions in the products from the primary reaction zone 13;
  (b) ensures that the heat released by such oxidation is transferred to the bath; and (c) scrubs any volatilized species such as metal contaminants and any particulate material from the reaction products.

The preheated air may be injected into the secondary reaction zone 17 by any suitable means such as top-blowing single or multiple tuyeres or lances with one or more openings.

The preferred embodiment of the method of the invention shown in FIG. 2 is similar to that shown in FIG. 1 and further comprises injecting oxygen or any other suitable oxygen-containing gas with organic waste through the tuyeres 5 into the primary reaction zone 13. The oxygen and organic waste move upwardly towards the surface of the bath and are thermally cracked and at least partially oxidized. A proportion of the products of the thermal cracking and partial oxidation remain in the bath and the remainder of the products are released from the bath into the space above the primary reaction zone 13. Typically, the products released into the space above the primary reaction zone 13 comprise the oxidizable materials CO, $H_2$ and carbonaceous material arising from the thermal cracking of the organic waste, and other volatilized species present as contaminants in the organic waste or added with the organic waste.

It is noted that there are a number of possible reactions for oxygen injected into the primary reaction zone 13 through the tuyeres 5. In addition to the series of preferred reactions noted in the preceding paragraph the oxygen can react with the iron and dissolved carbon in the iron to form FeO and CO. These reactions have the effect of decreasing the amount of oxygen available for the preferred reactions on the products of thermal cracking of the organic waste and are undesirable for this reason. In addition, the reactions are undesirable because the CO produced increases the gas volume and depletes the level of dissolved carbon in the iron and therefore decreases the capacity of the bath to reduce the FeO. These are essentially competing reactions in the sense that varying the level of dissolved carbon in the iron has opposite effects on the reactions. By way of explanation, maintaining a high level of dissolved carbon in the iron results in a relatively high level of CO and a low level of FeO and, on the other hand, maintaining a low level of dissolved carbon in the iron results in a relatively low level of CO and a relatively high level of FeO. As a consequence, it is necessary to maintain the level of dissolved carbon in the iron within an appropriate range.

By way of example, in situations where molten metal comprises at least 60% iron the applicant has found that optimum operation can be achieved by maintaining the carbon concentration of the bath in the range of 1 to 3 wt.% and the molten metal temperature between 1350° and 1600° C. Under such operating conditions it was found that substantially all the metal oxides injected into the bath were reduced to metals.

With the above in mind, the method shown in FIG. 2 comprises injecting coal or any other suitable carbonaceous material into the bath through the bottom tuyeres 7 to form a carburization zone indicated schematically by the arrow 15. The volatiles in the coal are thermally cracked and the carbon dissolves in the iron and disperses through the bath and in particular into the primary reaction zone 13.

It is noted that the heat transfer from the secondary reaction zone 17 to the bath is important since the reactions in the carburization zone 15 are essentially endothermic and it is important to balance the heat loss due to such reactions to maintain the temperature of the bath at a level which can thermally crack the organic waste.

The preferred embodiment of the method of the present invention shown in FIG. 3 is similar to that shown in FIGS. 1 and 2 in that it includes directing the organic waste through a primary reaction zone 13 and a secondary reaction zone 17.

The method also includes injecting one or more additives into the molten metal through a bottom tuyere 61. The additives are selected to convert particular components of the organic waste, such as halogens, into more inert and/or more readily disposable forms.

The method also includes subsequently directing the products emerging from secondary reaction zone 17 through a tertiary reaction zone indicated schematically by the numeral 23 to provide a higher level of assurance. The tertiary reaction zone 23 is formed by injecting oxygen-containing gas through injection port 10 towards the surface of the bath and nitrogen or any other suitable gas through tuyeres into the bath below the tertiary reaction zone 23 to cause eruption of molten metal and slag in splashes and/or droplets into the tertiary reaction zone 23.

Typically, the oxygen-containing gas injected into the secondary reaction zone 17 comprises oxygen-enriched air containing 25% $O_2$ preheated to a temperature of 1350° C. and the oxygen-containing gas injected into the tertiary reaction zone comprises preheated air.

Many modifications may be made to the preferred embodiments of the method of the present invention shown in FIGS. 1 and 2 without departing from the spirit and scope of the present invention.

In this regard, whilst in the preferred embodiments the organic waste, oxygen-containing gas, and carbonaceous material are injected into the bath to form separate essentially macro-sized reaction and carburization zones in the bath, it can readily be appreciated that the present invention is not so limited and the injection of the constituents into the bath can be controlled to form arrays of separate essentially micro-sized primary reaction and carburization zones.

Furthermore, whilst the preferred embodiment shown in FIG. 2 includes the location of the secondary reaction zone 17 immediately above the carburization zone 15, it can readily be appreciated that the present invention is not so limited and the secondary reaction zone 17 may be located above a section of the bath that is adjacent to the carburization zone 15.

Furthermore, whilst in the preferred embodiments shown in FIGS. 2 and 3 the carbonaceous material is injected into the bath through bottom tuyeres, it can readily be appreciated that the present invention is not so limited and extends to the use of any suitable means including top-blowing tuyeres and lances.

We claim:

1. A method of destroying organic waste in a bath of molten metal and slag contained in a vessel, the method comprising:
   (a) injecting organic waste into the bath to form a primary reaction zone in which the organic waste is thermally cracked and the products of the thermal cracking which are not absorbed into the bath are released into the space above the surface of the bath;
   (b) injecting an oxygen-containing gas towards the surface of the bath to form a secondary reaction zone in the space above the surface of the bath in which the oxidizable materials in the products from the primary reaction zone are completely oxidized and the heat released by such oxidization is transferred to the bath; and (c) injecting a gas into the bath to cause molten metal and slag to be ejected upwardly from the bath into said secondary reaction zone to facilitate efficient heat transfer to the bath and scrubbing of volatilized species in the products from the primary reaction zone.

2. The method defined in claim 1, comprising injecting organic waste and a carrier gas into the bath to form the primary reaction zone.

3. The method defined in claim 1 or claim 2, further comprising injecting oxygen-containing gas into the primary reaction zone to at least partially oxidize the products of thermal cracking.

4. The method defined in claim 3, comprising injecting the oxygen-containing gas into the primary reaction zone in a stoichiometric ratio of oxygen to the oxidizable portion of at least 1:1.

5. The method defined in any one of the preceding claims, comprising controlling the temperature in the secondary reaction zone to be at least 200° C. higher than the temperature of the bath.

6. The method defined in claim 5, comprising controlling the temperature in the secondary reaction zone to be in the range of 1500° to 2700° C.

7. The method defined in claim 6, further comprising injecting carbonaceous material into the bath to form a carburizing zone in which the carbon in the carbonaceous material is dissolved into the bath.

8. The method defined in claim 7, comprising injecting the organic waste into the primary reaction zone through the bottom of the vessel.

9. The method defined in claim 4, comprising injecting the oxygen-containing gas into the primary reaction zone through the bottom of the vessel.

10. The method defined in claim 1, comprising injecting the gas into the carburizing zone of the bath with the carbonaceous material and injecting the oxygen-containing gas towards the surface of the bath above the carburizing zone so that the secondary reaction zone is located immediately above the carburizing zone.

11. The method defined in claim 1, comprising injecting the gas into the bath to form a gas injection zone adjacent the carburizing zone and injecting the oxygen-containing gas into the space above the gas injection zone.

12. The method defined in claim 1, further comprising injecting into the primary reaction zone an additive for forming preferred reaction products 13. The method defined in claim 12, wherein the additive comprises an alkaline earth.

14. The method defined in claim 13 further comprising, injecting slag forming agents into the bath together with or separately from the organic waste to condition selectively the composition of the slag.

15. The method defined in claim 14, wherein the slag forming agents comprise CaO and fluorspar.

16. The method defined in claim 15, wherein the bath comprises at least 10% metal.

17. The method defined in claim 16, wherein the bath comprises at least 70% metal.

18. The method defined in claim 17, wherein the bath comprises at least 80% metal.

19. The method defined in claim 18, wherein the metal is selected from one or more of the group comprising iron, ferroalloys, tin, nickel, chromium, silicon, and copper, and mixtures thereof.

20. The method defined in claim 19, wherein the metal comprises iron.

21. The method defined in claim 1, wherein the gas injected into bath to cause molten metal and slag droplets to be ejected upwardly into the secondary reaction zone is selected from one or more of an inert gas, a recycled process gas, natural gas, carbon dioxide, propane, or butane, or mixtures of the gases.

22. The method defined in claim 21, wherein the inert gas is nitrogen.

23. The method defined in claim 22, wherein the oxygen-containing gas injected into the secondary reaction zone is selected from one or more of the group comprising oxygen, air, oxygen enriched air, and steam.

24. The method defined in claim 23, further comprising preheating the oxygen-containing gas to a temperature in the range of 900° to 1600° C.

* * * * *